Nov. 1, 1966  L. J. RZEWINSKI  3,282,734
FUEL CELL WITH SERIES OF ELECTRODE SETS
Filed Sept. 26, 1961  2 Sheets-Sheet 2
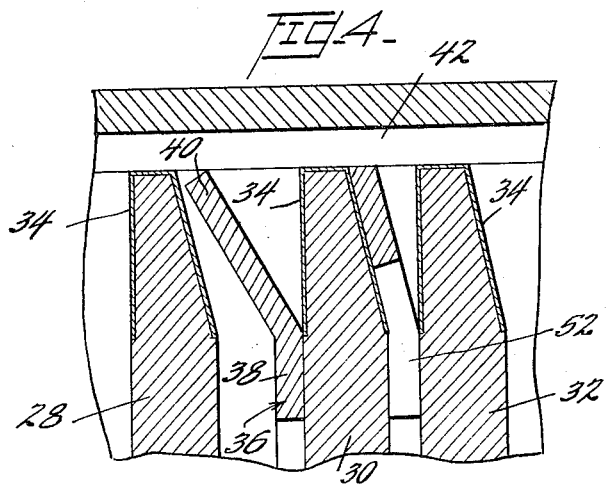
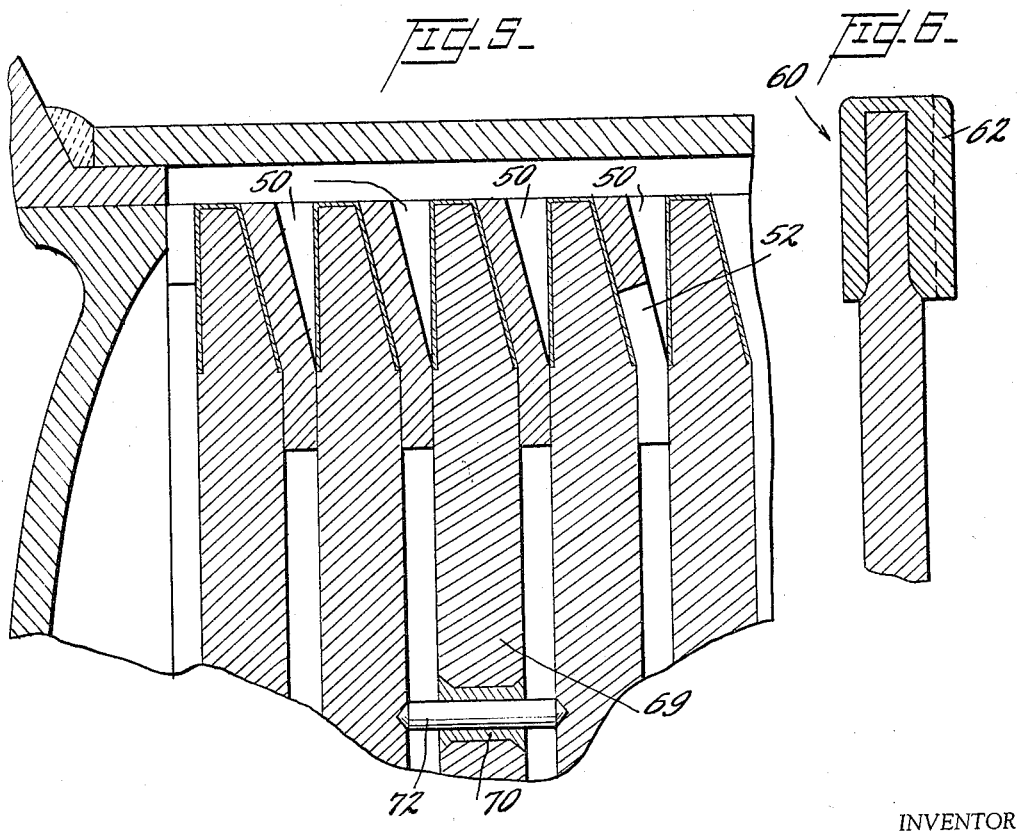
INVENTOR
Leonard J. Rzewinski
BY Watson, Cole, Grindle & Watson
ATTORNEY United States Patent Office 3,282,734
Patented Nov. 1, 1966

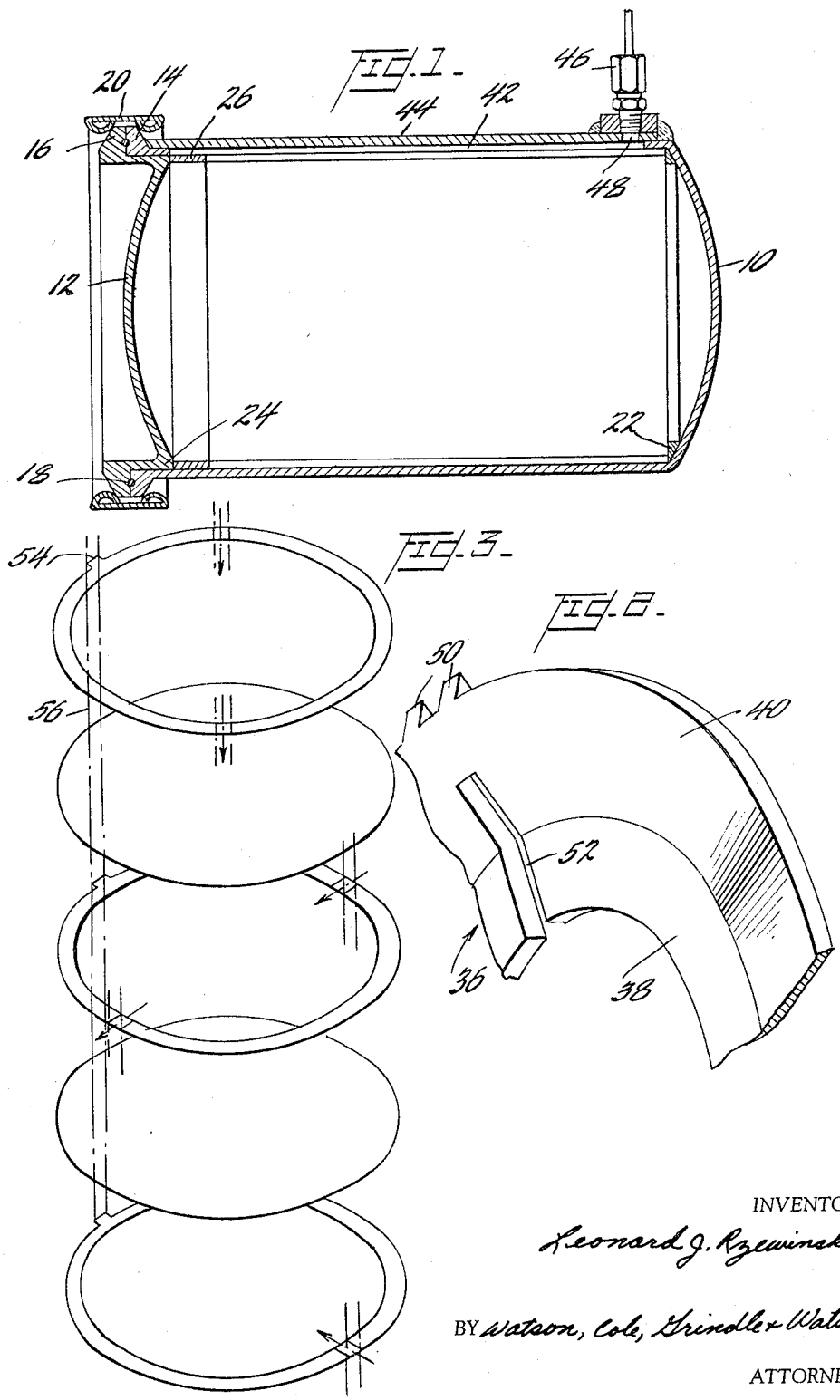

3,282,734
FUEL CELL WITH SERIES OF ELECTRODE SETS
Leonard J. Rzewinski, Brooklyn, N.Y., assignor to Leesona Corporation, Cranston, R.I., a corporation of Massachusetts
Filed Sept. 26, 1961, Ser. No. 140,770
3 Claims. (Cl. 136—86)

This invention relates to fuel cells. The invention provides an improved and novel fuel cell construction, and improved and novel means for insulating and sealing such cells and for electrically interconnecting a plurality of cell units.

Fuel cells generally consist of an assemblage of cell units, each of which comprises a set of sintered nickel electrodes. An electrolyte, such as KOH, is passed between the electrodes and a fuel gas, generally hydrogen, is supplied to the other side of one electrode while the oxidizing gas, generally oxygen, is applied to the other face of the second electrode. A fuel cell consists of an assemblage of such units, and in the past it has been the practice to make these assemblages by separating a series of electrodes from one another by means of interposed gaskets and drawing the whole assembly together on rods extending through registering holes provided in the gaskets, electrodes, or both. Fuel cells are ordinarily operated at elevated temperatures and pressures. In some instances, for example, the electrolyte and the fuel gases are fed to the cell at pressures in the neighborhood of 600 p.s.i. Consequently, gaskets which electrically isolate and separate the electrodes from one another are subjected to a pressure of approximately 600 p.s.i. Since the material supplied to the cell is both caustic and explosive, a faulty cell is dangerous. Precautions are generally required, since it is recognized that failure of the gasket material under such pressures will sometimes occur. A further drawback of present fuel cell constructions is that a tight cell, after an undetermined period of operation, will develop leaks which will impair the efficiency of its operation as well as create hazardous conditions. Consequently, the tightness of the cell must be frequently investigated.

One of the objects of the present invention is to provide a fuel cell which may be operated at high pressure without subjecting the means employed to insulate and seal the cell to high pressures.

A further object of the invention is to provide improved means for electrically insulating the electrodes of such a cell and sealing from one another the electrolyte and the gases fed to the cell.

A further object of the invention is to provide improved and novel means for electrically interconnecting the individual units making up a fuel cell.

Other aspects and advantages of the invention will be apparent from the following description of the presently preferred forms of the invention which are illustrated in the drawings.

In the drawings:

FIGURE 1 is a vertical longitudinal cross section of a pressure-resistant tank showing in elevation at the right-hand side one of the fittings connecting a supply of fuel cell material into the tank;

FIGURE 2 is a perspective view of a section of one form of annular separator employed in making a fuel cell assemblage according to one form of the invention;

FIGURE 3 is an exploded diagrammatic view of a series of electrodes and separators illustrating a key and slot arrangement whereby the separators may be positioned in the tank with certain entry ports in the separators in register with the proper material supply conduit;

FIGURE 4 is an enlarged view through a partial longitudinal section of an assembly of electrodes and separators within a tank showing the configuration of the outer edges of these electrodes and separators, their relative position before and after pressure has been applied to set them in operating position, and the manner in which the spaces between the electrodes are supplied with electrolyte or fuel gas, as appropriate;

FIGURE 5 is also a similar view through such an assembly, showing in its lower central portion one form of means for electrically interconnecting the individual units making up a fuel cell; and FIGURE 6 is a vertical sectional view through a portion of an electrode showing a different type of insulating and sealing separator carried by the outer edge of the electrode.

Referring to FIGURE 1, it may be seen that the fuel cell tank comprises a cup-shaped member 10, which has its open end covered by the removable end piece 12. The wall of the member 10, at its open terminal end, is provided with an upstanding flange 14. The removable end piece 12 is provided with a similar flange 16, which abuts the flange 14 when the removable end piece is in place. A sealing ring 18 is positioned between the abutting flanges, and the end piece is held in its closed position by the coupling member 20, which grips both flanges, all as shown in FIGURE 1. The tank thus provided is circular in cross section and is formed from a pressure-resistant material, which may be steel.

A number of electrode sets are assembled one alongside the other intermediate the concave ends of the pressure-resistant tank. A backing ring 22 having an outside curvature matching the concavity of the portion of the end wall against which it bears, is positioned at one end of the tank. The inner surface of this ring is flat, and perpendicular to the longitudinal axis along which the electrodes within the cell are assembled. The ring thus serves to provide a bearing surface for one of the endmost electrodes. The desired number of electrodes are assembled within the tank, and the space remaining, if any, between the outer edge of the leftmost electrode and the annular edge 24 of the removable end piece 12 may be occupied by an annular filler shim such as 26.

FIGURE 4 illustrates the manner in which the electrodes are assembled within the pressure resistant tank. All the electrodes are circular in cross section, and have an outside diameter closely approximating that of the inside diameter of the pressure-resistant tank. As shown in FIGURE 4, according to one form of the invention the outer edges of the electrodes 28, 30 and 32 are cut back on one side to provide a tapered edge which is sheathed by an insulating ring 34 which may be formed of Teflon or other insulating material which is resistant to the gases and electrolyte fed to the cell. The insulating rings or sheathing 34 electrically isolate the edges of the electrodes from the inner wall of the pressure-resistant tank.

Between each of the electrodes, in the form of the invention illustrated in FIGURE 4, there is positioned an insulating separator, generally denoted 36. A section of this form of insulating separator is also shown in FIGURE 2. The insulating separator is annular in form and comprises an inner, radially extending portion 38 from which extends a longitudinally displaced portion 40. As may be seen in FIGRUE 4, the portion 38 bears against the flat side of the electrodes, which the longitudinally displaced portion 40 extends outwardly into proximity with the inner wall of the tank, and the cutback, sheathed edge of the adjacent electrode. The relative position of the insulating separator and two adjacent electrodes, before the electrodes are pressed together into their final position, is illustrated in FIGURE 4 by the electrodes 28, 30 and the insulating separator shown between them. The relative position of the insulating separator and electrodes, when the cell is assembled and operating, is illustrated in FIGURE 5, and also in FIGURE 4, by the electrodes 30, 32 and the insulating separator between them.

Referring to FIGURE 4, it will be observed that when the electrodes and insulating separators are first inserted into the pressure resistant tank for assembly, the radially extending portion 38 of the separators will lie against the flat sides of the electrodes. When pressure is applied to contract the electrodes and insulating separators into their operating position, the extensions 40 of the separators will first contact the cut-back edge of the electrode towards which it is initially disposed, this face of the electrode then acting to wedge the outside edge of the separator into firm engagement with the inner wall of the tank as the electrodes are moved together. This wedging action continues until the mutually facing electrodes have each firmly engaged the radially extending portion 38 of the intermediate separator. A tight seal is thus provided between the electrodes and between the separators and the inner wall of the tank.

As explained above, it is necessary to supply electrolyte, a fuel gas and its oxidizing agent to each of the electrode sets. These supplies must, of course, be isolated from one another and delivered under high pressure, for example, in the neighborhood of 600 p.s.i. The manner in which these materials are supplied to the cell can be illustrated with reference to one, since all may be alike.

Referring to FIGURE 1, it may be seen that the pressure-resistant tank has been provided with a longitudinally extending slot 42 which extends substantially the full length of the tank. Above this slot is welded plate 44 to thus provide a channel or conduit, which may also be designated 42, in the inner wall of the tank. At one end, on the plate 44, there is mounted a tube fitting 46 which communicates with the conduit 42 through an aperture 48 provided in the plate 44. The portion of the separator which bears against the inner wall of the tank on either side of the conduit 42 is provided with wedge-like protrusions 50 on the back of the outer portion 40 of the separator. These may be seen best in FIGURES 2 and 4. When the separator is set between the electrodes in its operating position, these protrusions 50 prevent the material supplied by the conduit 42 from circulating circumferentially between the electrodes. This is required, since similar channels for the other materials supplied to the cell would otherwise be in communication with one another through the annular space between the outer edges of the separators and the flat side of each electrode. Where it is desired to have the space between the body of two electrodes supplied with the material carried in the conduit 42, a part of the portion 40 of the separator, an all of the radially extending portion 38, situated between the protrusions 50, is cut away, as illustrated in FIGURES 2 and 4. This provides an aperture 52 which communicates between the mutually facing surfaces of the electrode bodies and the conduit 42, as shown in FIGURE 4. A similar arrangement is employed to introduce the electrolyte and both the fuel gases to the appropriate spaces between the bodies of the electrodes.

Where it is desired to prevent the material carried in the conduit 42 from entering between electrodes, this aperture 52 is omitted, and the conduit thus communicates only with the small space lying between the protrusions 50, the portion 40 of the separator and the flat side of the adjacent electrode.

The conduits for each of these different materials are spaced circumferentially from one another about the inner wall of the tank, as illustrated diagrammatically in FIGURE 3. In order that the separators may be inserted in proper position within the cell to admit one supply material between any two electrodes and exclude the others, a key and slot construction is employed which is illustrated diagrammatically in FIGURE 3. It may be seen there that each of the separators is provided with a radially protruding key 54 which is received in a longitudinally extending slot 56 formed in the inner surface of the pressure-resistant tank. This assures that the sealing elements 50 as well as the apertures 52, where provided, will be correctly placed when the electrodes and separators are assembled within the tank.

FIGURE 6 shows an insulating separator 60 which may be employed in lieu of the separator 36 and the sheathing 34 described above. This separator is annular in form, and has a radially extending recess which receives the outer edge of the electrode as shown clearly in FIGURE 6. The outer edge of the electrode which is received in the recess is reduced in cross section, and the separator, which may be of Teflon or comparable insulating, chemical-resistant material, is sintered into the electrode. Where it is desired to admit between adjacent electrodes the material supplied through one of the conduits, as 42 for example, the outer edge of the portion of the separator 60 lying radially inward of the conduit is cut away. This would be done, for example, by cutting away the portion 62 lying to the right of the dotted line shown in FIGURE 6. The separators 60 also are provided with protruding key members such as 54 on the separators 36 which are similarly received in the slot 56 when assembling the cell. The separator shown in FIGURE 6 thus serves to electrically insulate the electrodes from one another and from the pressure-resistant tank, and in addition, serves as a spacer for the electrodes.

FIGURE 5 illustrates a simple, conveniently employed, positive means for electrically interconnecting cell units of the illustrated fuel cell battery. This figure shows the interconnecting means being employed to interconnect the positive and negative electrodes of adjacent cells, so that the output of the cells is taken off in series. The interconnecting means comprises an insulator 70 which extends longitudinally from one side of the electrode 69 to the other. Supported within this insulator is an electrically conductive probe 72 which protrudes on both sides beyond the surface of the electrode and into contact with the electrodes on either side. The electrodes on either side of electrode 69 are thus electrically interconnected, but insulated from the electrode 69. The ends of the probe are preferably pointed so that they will press into the adjacent electrodes and make a firm electrical connection when the electrodes are pressed together in the course of assembling the cell. It will be evident that this same means of interconnecting cells may be employed to take off the output of the individual cells in parallel as well as series. A single probe substantially the length of the cell may be passed through insulators carried in the body of certain electrodes and through the other electrodes themselves to provide the desired isolation or connection between the electrodes. In the majority of instances, however, a series connection is desired and the type of interconnecting probe shown in FIGURE 5 would be employed.

It may be seen from the above that the present invention provides a safe, readily assembled fuel cell having improved, positively acting interconnecting means between units of the cell. Since the assembly of electrodes and separators are within the pressure-resistant tank, the only pressure to which they are subjected is represented by the difference in pressure at which the electrolyte and fuel gases are introduced. Normally the fuel gases will be at a pressure of about 3 pounds above that of the electrolyte, for example 603 pounds as against 600 pounds, in order to develop the desired interface between the respective gases and the electrolyte within the body of the electrodes. The sealing separators here, however, are subjected only to the difference of 3 pounds, and consequently are able to maintain their integrity and are no longer the limiting factor in the useful life of a cell.

Having thus described the invention, what is claimed as new and desired to be secured by Letters Patent is:

1. A fuel cell comprising a tank, a series of electrode sets with an electrolyte space therebetween positioned within the tank and spaced apart along its longitudinal axis, electrically insulating sealing means positioned between the outer edges of all of said electrodes and the inner surface of said tank and between the outer edges of said electrodes to space the sets apart as aforesaid and to provide the said electrolyte space between the electrodes of each set, said sealing means comprising an annular gasket adjacent each electrode having an inner portion lying in a radial plane and an outer portion longitudinally displaced therefrom, the outer edges of said electrodes on one side being cut back from a radial plane to a lesser degree but in the same direction as the outer portions of said gaskets, and the displaced portion of said gaskets bearing against the cut back portions of said electrodes.

2. The fuel cell of claim 1 wherein said tank, said electrodes and sealing means are circular in cross section.

3. A fuel cell comprising a series of electrode sets with an electrolyte spaced therebetween, electrically insulating sealing means positioned between the outer edges of said electrodes to space the sets apart and to provide said electrolyte space between the electrodes of each set, at least one electrode of said series of electrodes having an electric insulator extending from one side to the other and an electrical conductor protruding through said insulator, and not contacting said one electrode, and into contact with the electrodes on either side of said one electrode.

References Cited by the Examiner
UNITED STATES PATENTS

| | | | |
|---|---|---|---|
| 1,371,998 | 3/1921 | Gill | 136—79 |
| 2,969,315 | 1/1961 | Bacon | 136—86 |
| 2,990,442 | 6/1961 | Barnett | 136—86 |
| 2,996,564 | 8/1961 | Morton | 136—86 |
| 3,012,086 | 12/1961 | Vahldieck | 136—86 |

WINSTON A. DOUGLAS, *Primary Examiner.*

JOHN R. SPECK, H. FEELEY, A. B. CURTIS,
*Assistant Examiners.*